US008884592B2

(12) United States Patent
Mirea

(10) Patent No.: US 8,884,592 B2
(45) Date of Patent: Nov. 11, 2014

(54) FREQUENCY LOCK LOOP FOR HYSTERETIC SWITCHING REGULATORS

(75) Inventor: Iulian Mirea, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 297 days.

(21) Appl. No.: 13/219,148

(22) Filed: Aug. 26, 2011

(65) Prior Publication Data

US 2013/0049711 A1 Feb. 28, 2013

(51) Int. Cl.
*G05F 1/00* (2006.01)
*H02M 3/156* (2006.01)

(52) U.S. Cl.
CPC ................................... *H02M 3/1563* (2013.01)
USPC ........................................... 323/271; 323/282

(58) Field of Classification Search
CPC ............... H03L 7/06; H03L 7/08; H03L 7/14; H03L 7/085; H03L 7/087; H03L 7/089; H03L 7/091; H03L 7/095; H02M 2001/0025; H02M 3/156; H02M 3/1563
USPC .......................... 323/234, 271, 282–285, 351; 327/156–158
See application file for complete search history.

(56) References Cited

U.S. PATENT DOCUMENTS

| 6,348,780 | B1 * | 2/2002 | Grant ............................. 323/222 |
| 6,396,251 | B2 * | 5/2002 | Corva et al. .................... 323/283 |
| 6,885,175 | B2 * | 4/2005 | Mihalka ......................... 323/282 |
| 8,008,902 | B2 * | 8/2011 | Melanson et al. ............. 323/285 |
| 8,441,231 | B2 * | 5/2013 | Menegoli et al. ............. 320/128 |
| 2003/0214332 | A1 * | 11/2003 | Chen et al. ..................... 327/156 |
| 2006/0103362 | A1 * | 5/2006 | Eberlein ........................ 323/282 |
| 2007/0120497 | A1 * | 5/2007 | Liu ............................. 315/209 R |
| 2007/0236188 | A1 * | 10/2007 | Gibson et al. ................. 323/225 |
| 2008/0042633 | A1 * | 2/2008 | Klein ............................. 323/288 |
| 2011/0316502 | A1 * | 12/2011 | Tang et al. .................... 323/271 |
| 2013/0002212 | A1 * | 1/2013 | Fan .................................. 323/235 |
| 2013/0015829 | A1 * | 1/2013 | Menegoli et al. ............. 323/282 |

OTHER PUBLICATIONS

Se-Won Wang; Young-Jin Woo; Young-Sub Yuk; Byunghun Lee; Gyu-Ha Cho; Gyu-Hyeong Cho, "Low-ripple hysteretic-controlled monolithic buck converter with adapted switching frequency for large step-down ratio applications," Applied Power Electronics Conference and Exposition (APEC), Twenty-Sixth Annual IEEE , vol., No., pp. 1512,1515, Mar. 6-11, 2011.*

(Continued)

*Primary Examiner* — Timothy J Dole
*Assistant Examiner* — Ivan Laboy Andino
(74) *Attorney, Agent, or Firm* — Sterne, Kessler, Goldstein & Fox PLLC

(57) ABSTRACT

Embodiments of the present invention provide systems and methods for reducing switching frequency variation in a hysteretic switching regulator. Embodiments of the present invention provide a new duty cycle controller for a switching regulator incorporating a new Frequency Lock Loop (FLL) for controlling the hysteresis of a comparator, and this hysteresis variation directly controls the switching frequency. The FLL of the present invention advantageously maintains a fixed frequency operation for a switching regulator while not affecting the transient response or stability of the main loop because it only changes the hysteresis of the fast comparator and does not introduce delays in the main loop of the switching regulator. Thus, the FLL of the present invention advantageously maintains a fixed switching frequency while causing a minimal impact to the switching regulator.

20 Claims, 10 Drawing Sheets

(56) References Cited

OTHER PUBLICATIONS

Chung-Hsien Tso; Jiin-Chuan Wu, "A ripple control buck regulator with fixed output frequency," Power Electronics Letters, IEEE, vol. 1, No. 3, pp. 61,63, Sep. 2003.*

Redl, R.; Jian Sun, "Ripple-Based Control of Switching Regulators-An Overview," Power Electronics, IEEE Transactions on, vol. 24, no. 12, pp. 2669,2680, Dec. 2009.*

Su F. et al., "Ultra Fast Fixed-Frequency Hysteretic Buck Converter With Maximum Charging Current Control and Adaptive Delay Compensation for DVS Applications", *IEEE Journal of Solid State Circuits*, vol. 3, No. 4, Apr. 2008, pp. 815-822.

"FAN5361—6MHz, 600mA/750mA Synchronous Buck Regulator", Fairchild Semiconductor, 2008, 18 pages.

"1000-mA, 6-MHz High-Efficiency Step-Down Converter in Chip Scale Packaging", Texas Instruments, 2010, 30 pages.

* cited by examiner

FREQUENCY LOCK LOOP FOR HYSTERETIC SWITCHING REGULATORS

FIELD OF THE INVENTION

This invention relates to switching regulators and more specifically to hysteretic switching regulators with control systems to reduce switching frequency variation.

BACKGROUND OF THE INVENTION

Switching regulators are designed to provide a regulated output voltage from an unregulated input voltage. They are frequently implemented in battery-powered electronic devices to regulate the battery output voltage which, when charged or discharged, can be greater than, less than, or substantially the same as the desired output voltage.

In general, a switching regulator works by periodically transferring small amounts of energy from the input voltage source to the output. This is accomplished with the help of one or more power switches and a controller that regulates the rate at which energy is transferred to the output. For example, a duty cycle controller can be used to generate a duty signal that instructs the switches when to toggle on and off.

There are several different topologies for implementing a duty cycle controller. Depending on the topology, the ratio of the on time of switch to the switching period can be altered in a number of ways. Two common approaches are pulse-width modulation (PWM) and variable frequency control topologies. In PWM-based control topologies, the switching period is fixed, and the on time of the switch is varied. Conversely, in variable frequency control topologies, the switching period is not fixed but rather changes as the on time and/or off time of the switch is varied.

Hysteretic switching regulators are one type of switching regulator based on a variable frequency control topology. These switching regulators have several advantages over switching regulators based on PWM control topologies. For example, unlike switching regulators based on PWM control topologies, hysteretic switching regulators do not require an oscillator and therefore are generally simpler to implement.

However, the potentially wide switching frequency variation of hysteretic switching regulators during operation makes it difficult and expensive to filter electromagnetic interference (EMI) caused by switching, which can interfere with sensitive RF components near and powered by the regulator.

Therefore, what is needed is a hysteretic switching regulator with reduced EMI.

BRIEF DESCRIPTION OF THE DRAWINGS/FIGURES

The accompanying drawings, which are incorporated in and constitute part of the specification, illustrate embodiments of the invention and, together with the general description given above and the detailed descriptions of embodiments given below, serve to explain the principles of the present invention. In the drawings.

Figure 1A:
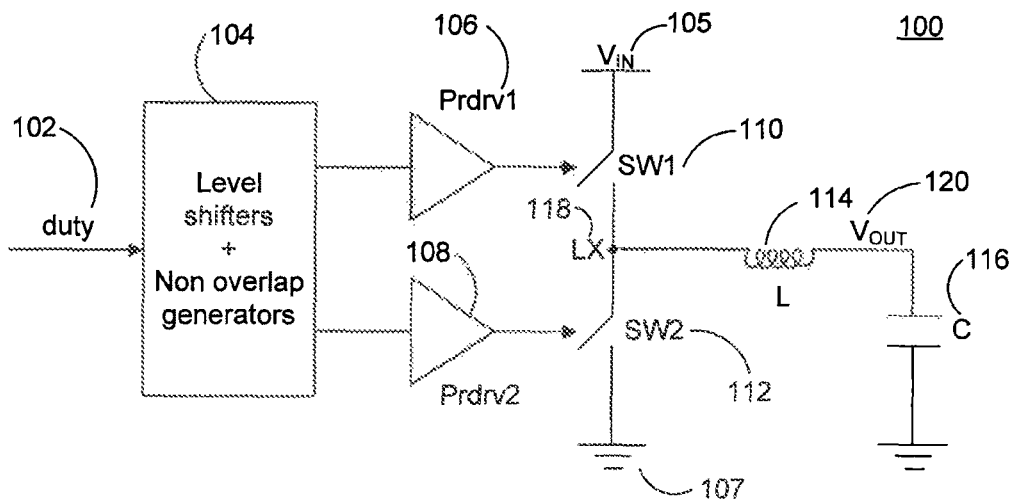
FIG. 1A is a diagram of a conventional Buck switching regulator configured to provide a regulated output voltage responsive to a stepped input voltage.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number. It should be understood that the drawings, and elements therein, are not necessarily drawn to scale.

DETAILED DESCRIPTION OF THE INVENTION

In the following description, numerous specific details are set forth to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

Previous switching regulators with hysteretic control are designed with the switching frequency strongly dependent on system parameters like input and output voltage, as well as process parameters, like RC variations. Wide variations in the switching frequency of a hysteretic switching regulator is not acceptable for many systems due to possible interference with other sensitive components.

Embodiments of the present invention provide systems and methods for reducing switching frequency variation in a hysteretic switching regulator. Embodiments of the present invention provide a new Frequency Lock Loop (FLL) for controlling the hysteresis of a comparator, and this hysteresis variation directly controls the switching frequency. The FLL of the present invention advantageously maintains a fixed frequency operation for a switching regulator while not affecting the transient response or stability of the main loop, because it only changes the hysteresis of the fast comparator and does not introduce delays in the main loop of the switching regulator. Thus, the FLL of the present invention causes a minimal impact to the switching regulator coupled to the FLL.

Further, by deriving a reference frequency from a delay rather than a reference clock, the FLL of the present invention advantageously prevents mixing between a reference clock output and an actual output frequency, which can lead to unwanted spurs in the main switching regulator output. Additionally, the transfer function of the proposed FLL can be easily derived, and its transient response and stability can be easily ensured and optimized. Embodiments of the present invention enable the switching frequency to be adjusted with fine steps to meet system requirements.

1.1 Buck Switching Regulator

FIG. 1A illustrates a conventional Buck switching regulator 100 that provides a regulated output voltage $\backslash V_{OUT}$ 120 responsive to a stepped input voltage $V_{IN}$ 105. In FIG. 1A, duty signal 102 is input into Buck switching regulator 100 to regulate switches SW1 110 and SW2 112. Duty signal 102 is input into level shifters and non-overlap generators 104, which generate the input signal for pre-drivers 106 and 108. Level shifters and non-overlap generators 104 ensure that there is no cross-conduction between switches 110 and 112 (e.g., level shifters and non-overlap generators 104 ensure that switches 110 and 112 are not switched on at the same time). When activated by level shifters and non-overlap generators 104, predrivers 106 and 108 generate a voltage to drive MOSFETs in switches 110 and 112 so that switches 110 and 112 are toggled to a closed state. Likewise, predrivers 106 and 108 instruct switches 110 and 112 to open when predrivers 106 and 108 are not activated by level shifters and non-overlap generators 104.

In the step-down regulator of FIG. 1A, the basic circuit operation is to close switch 110 for a time $t_{ON}$ (connecting $V_{IN}$ 105 to the circuitry in Buck switching regulator 100) and then open it for a time $t_{OFF}$ (connecting ground 107 to the circuitry in Buck switching regulator 100). The total on and off time of switch 110 is referred to as the switching period $T_{SW}$ 136. Switch 112 is controlled in the opposite manner as switch 110 (i.e., switch 112 is off while switch 110 is on, and switch 112 is on while switch 110 is off). Thus, ignoring any voltage drop across switches 110 and 112, and ignoring any stored energy in inductor 114 and capacitor 116, switching node voltage ("LX") 118 is $V_{IN}$ 105 during the time $t_{ON}$ and ground (zero) 107 during the time $t_{OFF}$.

With switches 110 and 112 turning on and off, high-frequency voltage pulses are applied at the input of the LC circuit formed by inductor 114 and capacitor 116, and an averaged DC level is produced as $V_{OUT}$ 120. By altering the ratio of the on time of switch 110 to the switching period $T_{SW}$ 136, the averaged DC level of $\backslash T_{OUT}$ 120 can be changed. Switching node voltage LX 118 and $V_{OUT}$ 120 are input into duty cycle controller 122, which is shown in FIG. 1B.

Figure 1B:
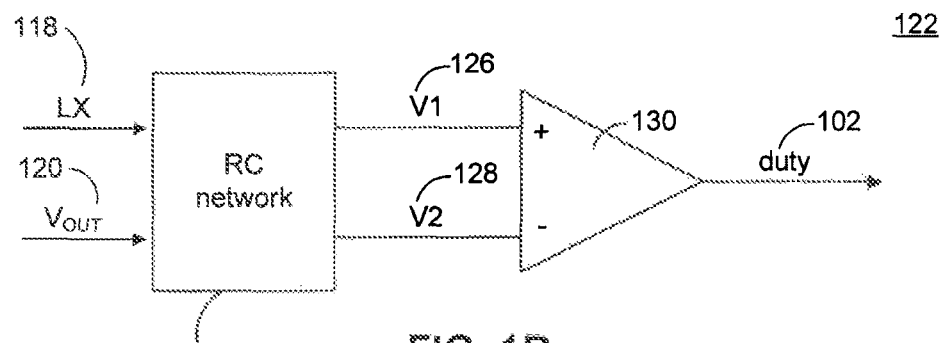
FIG. 1B is a diagram of duty cycle controller configured to generate a duty signal for a switching regulator.

FIG. 1B is a diagram of duty cycle controller 122 configured to generate duty signal 102. Duty cycle controller 122 is configured to adjust the ratio of the on time of switch 110 to the switching period in accordance with a feedback signal input to duty controller 122 from LX 118 and $V_{OUT}$ 120. The ratio of the on time of switch 110 to the switching period $T_{SW}$ 136 is altered as needed by duty cycle controller 122 to regulate the output voltage $V_{OUT}$ 120 to the desired level.

LX 118 and $V_{OUT}$ 120 are input into RC network 124, which combines $V_{OUT}$ 120 and LX 118 into a ramping up and down signal based on the differential voltage between outputs V1 126 and V2 128 (representing the voltage across inductor L 114), which are input into hysteretic comparator 130 ("comparator 130"). Comparator 130 generates duty signal 102 based on the relative values of V1 126 and V2 128. As previously discussed, duty signal 102 is input, from comparator 130, into level shifters and non-overlap generators 104.

Figure 1C:
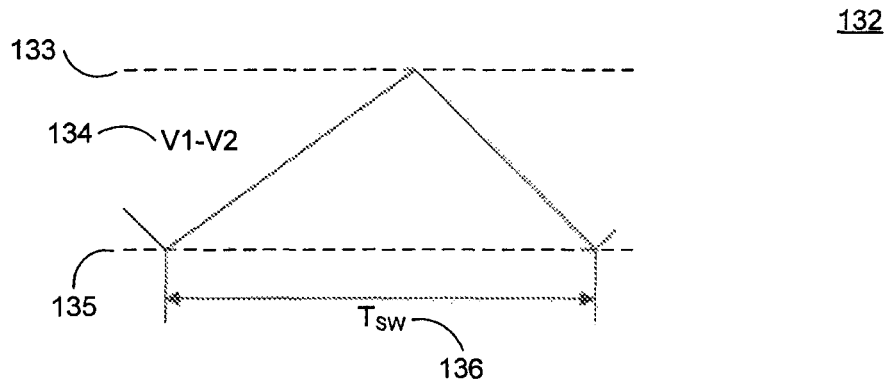
FIG. 1C shows a diagram illustrating a differential voltage at the input of a comparator.

FIG. 1C shows a diagram 132 illustrating the differential voltage "V1-V2" 134 at the input of comparator 130, where V1-V2 134 represents V1 126-V2 128. Although V1-V2 134 is shown as a linear signal in FIG. 1C, it should be understood that this signal is not necessarily a linear signal and that the others signals discussed in this application are not necessarily linear signals. The slope of the signal V1-V2 134 is generally dependent on a series of system parameters including input voltage $V_{IN}$ 105, output voltage $V_{OUT}$ 120, inductance L 114, capacitance C 116, as well as process parameters like resistance and capacitance variation, temperature, etc.

The voltage across inductor L 114 has a step response as switches 110 and 112 are toggled on and off. Comparator 130 outputs a "low" signal when the value of V1-V2 134 reaches a high threshold 133. Comparator 130 outputs a "high" signal when the value of V1-V2 134 reaches a low threshold 135. These "high" and "low" signals are passed as duty signal 102 to Buck switching regulator 100 to regulate switches 110 and 112. The amount of time between two "high" signals or two "low" signals in duty signal 102 is the switching period $T_{SW}$ 136.

For example, when switch 110 is closed and switch 112 is open, $V_{IN}$ 105 supplies power to the LC circuit of inductor 114 and capacitor 116. RC network 124 measures switching node voltage LX 118 and $V_{OUT}$ 120 and integrates these signals to generate signals V1 126 and V2 128, which serve as voltage signals representative of the current flowing through inductor 114. Hysteretic comparator 130 maintains $V_{OUT}$ 120 at a regulated level by measuring V1-V2 134, representing the current flowing through inductor 114.

When V1-V2 134 reaches high threshold 133, comparator 130 inverts the duty signal (i.e., comparator 130 generates a logical "low" signal) to instruct switch 110 to open and switch 112 to close. Because inductor 114 is now connected to ground 107 rather than $V_{IN}$ 105, the value of V1-V2 134 decreases. When V1-V2 reaches low threshold 135, comparator 130 inverts the duty signal (i.e., comparator 130 generates a logical "high" signal) to instruct switch 110 to close and switch 112 to open. If the capacitance of capacitor 116 is large enough, $V_{OUT}$ 120 should not significantly change while switches 112 and 110 turn on and off and should be maintained at the desired regulated voltage value.

1.2 Switching Frequency

As shown in FIG. 1C, the period of the switching frequency $T_{SW}$ 136 depends strongly on the slope of the comparator input signal V1-V2 134. Therefore, the switching frequency will vary significantly as a function of system parameters or process parameters. In many applications, such a wide variation of switching frequency is not acceptable, and a method to keep switching frequency constant or within tight limits is required.

Introducing a delay directly into the duty signal that is proportional to the frequency of the duty signal can reduce switching frequency variation. However, such a solution has several disadvantages. One disadvantage is that the natural switching frequency (without added delay) must be higher than correcting range of the delay compensation circuitry. For example, if the final (delay compensated) switching frequency is 6 MHz, the natural switching frequency should be typically higher in order of 10 MHz or more, which puts more pressure on the requirements for comparator 130 and RC network 124.

Another disadvantage of using duty signal delay compensation is that the main loop response may be affected by introducing additional delays into the loop. For example, main loop parameters (e.g., stability, transient response, etc.) may be dependent on the state of the additional delay compensation circuitry. Further, the delay compensation circuitry adds more dependency on process parameters that require additional compensation.

Embodiments of the present invention provide a new Frequency Lock Loop (FLL) for controlling the switching frequency of the hysteretic switching regulator while avoiding the disadvantages of using duty signal delay compensation.

2. SYSTEMS

2.1 Duty Cycle Controller

Figure 2A:
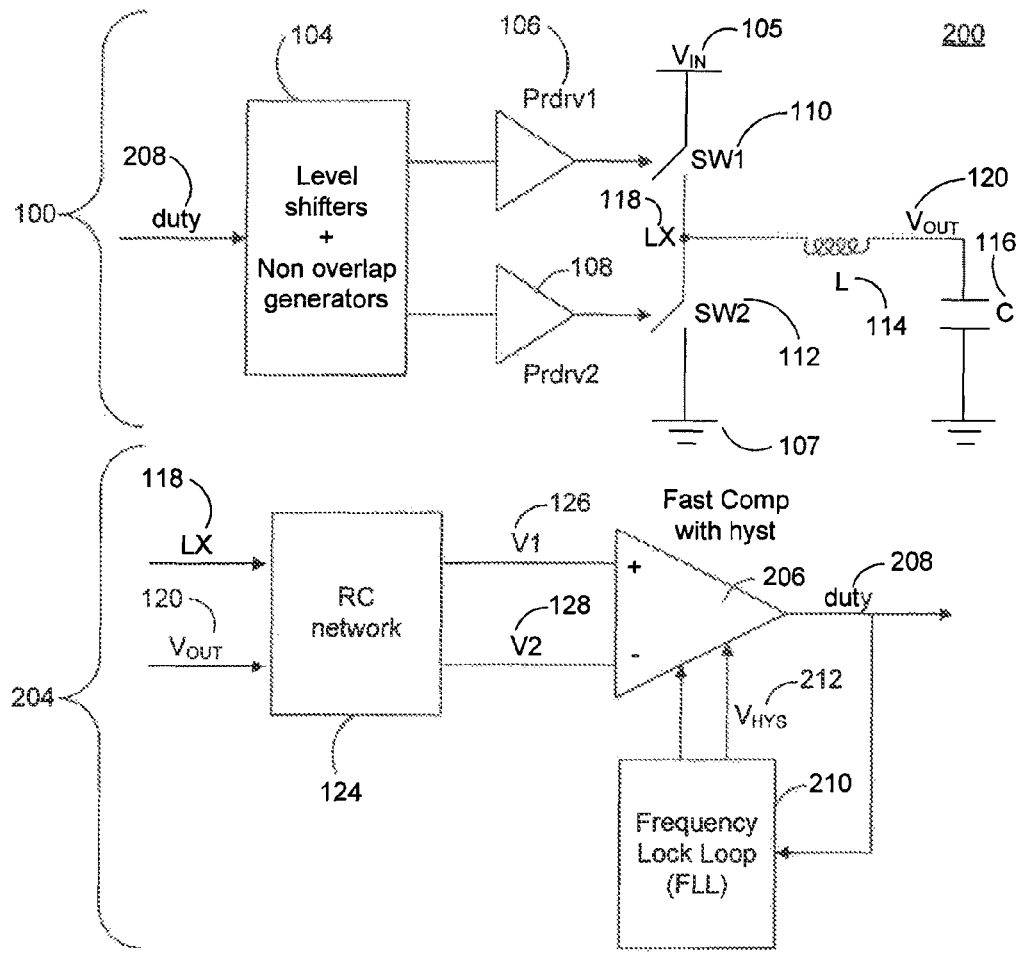
FIG. 2A shows a diagram of a Buck switching regulator incorporating a new duty cycle controller according to an embodiment of the present invention.

FIG. 2A shows a diagram of a Buck switching regulator system 200 including a duty cycle controller 204 to control (core) Buck switching regulator 100, according to an embodiment of the present invention. Duty cycle controller 204 includes fast comparator with hysteresis 206 ("comparator 206"), which is configured to output duty signal 208 that is hysteretically compensated by FLL 210. In an embodiment, comparator 206 is identical to comparator 130 shown in FIG. 1B. In another embodiment, comparator 206 includes additional circuitry to process changes in hysteresis based on a signal received from FLL 210.

The FLL 210 provided by embodiments of the present invention controls the hysteresis of comparator 206 by sending a signal $V_{HYS}$ 212 to a control input of comparator 206. By adjusting the hysteresis of comparator 206, this signal directly controls the switching frequency of switches 110 and 112. FLL 210 detects the switching frequency of Buck switching regulator 100 based on duty signal 208, which is generated by comparator 206. Based on the frequency of duty signal 208, FLL 210 adjusts the hysteresis of comparator 206 such that the switching frequency is corrected to the desired value.

As previously discussed, comparator 206 is a hysteretic comparator. In other words, rather than outputting a signal based on which of two inputs is larger, comparator 206 outputs "high" and "low" signals when the difference between V1 126 and V2 128 reaches predetermined threshold values.

By configuring one of more of these predetermined threshold values to be higher or lower, the hysteresis of comparator 206 can be adjusted.

Figure 2B:
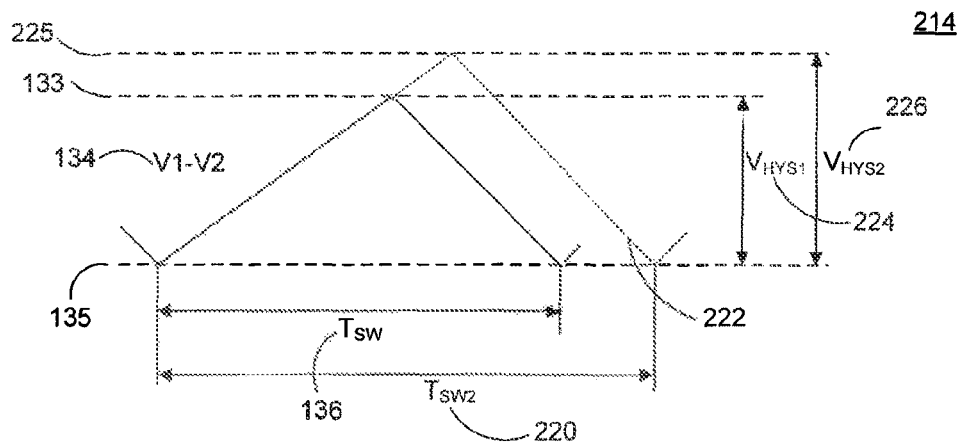
FIG. 2B shows a diagram illustrating voltage thresholds of a hysteretic comparator.

FIG. 2B shows a diagram 214 illustrating voltage thresholds of comparator 206. In FIG. 2B, the initial hysteresis of comparator 206 is represented by $V_{HYS1}$ 224. In other words, comparator 206 is initially set to output logical "high" or "low" signals when the value of V1-V2 134 reaches predetermined thresholds 133 and 135.

Initially, when the hysteresis of comparator 206 is set to $V_{HYS1}$ 224, the switching period is $T_{SW}$ 136. Assuming no variation in system parameters, if the hysteresis of comparator 206 is set to $V_{HYS2}$ 226, the switching period is increased to $T_{SW2}$ 220 because it takes longer for V1-V2 222 to ramp up to the new threshold 225. This increase in switching period leads to a reduction in switching frequency. Likewise, if $V_{HYS}$ is reduced, the switching frequency is increased, because V1-V2 134 will reach a lower threshold faster than a higher threshold.

Changes in systems parameters can also affect the switching frequency of switches 110 and 112. As these systems parameters change, the switching frequency of Buck switching regulator 100 can be maintained constant at a predetermined value (e.g., the switching frequency is controlled to be at a specified value and/or is controlled to be within a predefined window of the specified value) by adjusting $V_{HYS}$ 212 accordingly. Embodiments of the present invention provide systems and method for adjusting $V_{HYS}$ 212 of comparator 206 using FLL 210 to maintain a constant switching frequency of switches 110 and 112 as system parameters change.

For example, switching period $T_{SW}$ 136 can start to undesirably increase 222. This increase 222 can be due to variations in system parameters or process parameters in circuitry of either duty cycle controller 204, Buck switching regulator 100, and or additional circuitry coupled to these elements. In response to detecting this increase 222, the FLL 210 adjusts the hysteresis of comparator 206 to maintain $T_{SW}$ 136 at a desired value.

Figure 2C:
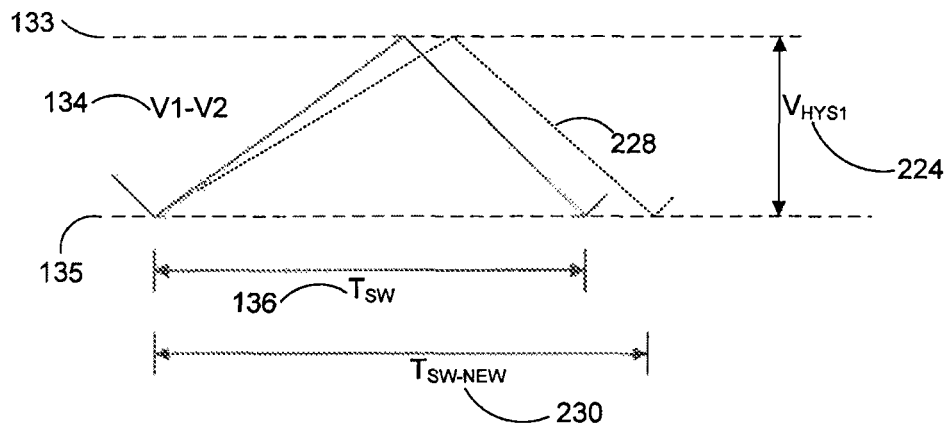
FIGS. 2C and 2D illustrate an example of adjusting hysteresis of a comparator to keep switching frequency constant in accordance with embodiments of the present invention.
Figure 2D:
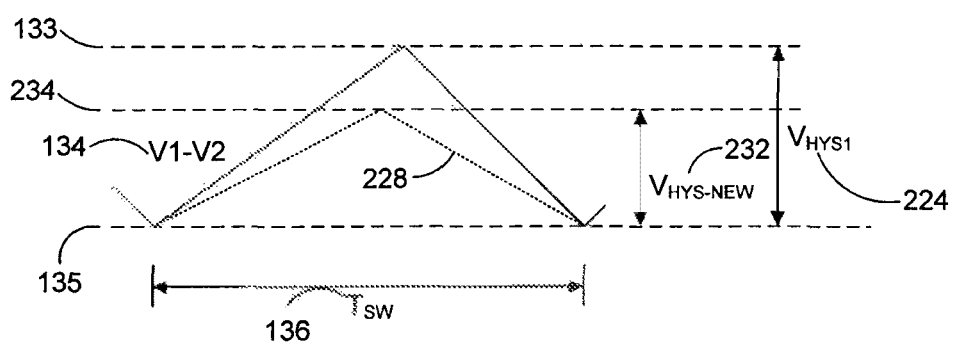

FIGS. 2C and 2D illustrate an example of adjusting hysteresis of a comparator to keep switching frequency constant in accordance with embodiments of the present invention. In FIG. 2C, the switching period is initially $T_{SW}$ 136. Variations in system parameters or process parameters cause switching period $T_{SW}$ 136 to attempt to increase to a new level $T_{SW\text{-}NEW}$ 230. V1-V2 228 takes longer to reach threshold 133 as the switching period increases. To keep switching period $T_{SW}$ 136 constant (and thus to keep the switching frequency constant), FLL 210 adjusts the hysteresis of comparator 206 to force the switching period to be maintained at $T_{SW}$ 136.

FIG. 2D illustrates this change in hysteresis. In FIG. 2D, FLL 210 configures the hysteresis of comparator 206 to a new level $V_{HYS\text{-}NEW}$ 232. $V_{HYS\text{-}NEW}$ 232 can be configured by, for example, lowering threshold 133 to a new level 234. This causes V1-V2 228 to reach new threshold 234 faster, maintaining the switching period at $T_{SW}$ 136. In an embodiment, $V_{HYS\text{-}NEW}$ 232 corresponds to signal $V_{HYS}$ 212 shown in FIG. 2A. In another embodiment, $V_{HYS\text{-}NEW}$ 232 is modified before it is transmitted to comparator 206 as signal $V_{HYS}$ 212.

Figure 2E:
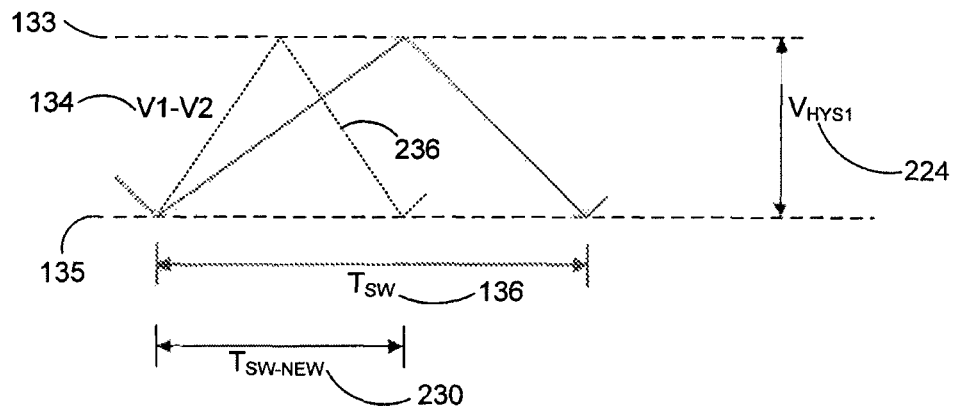
FIGS. 2E and 2F illustrate another example of switching period correction in accordance with embodiments of the present invention.
Figure 2F:
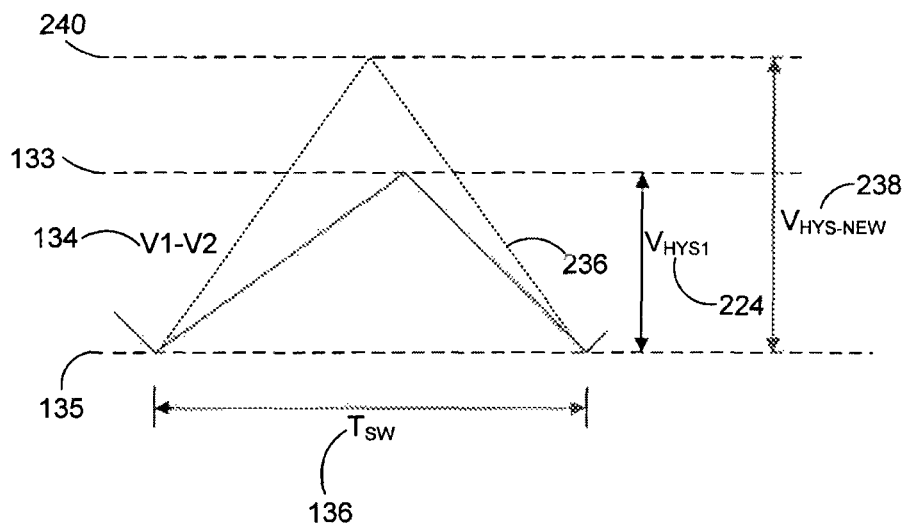

FIGS. 2E and 2F illustrate another example of adjusting hysteresis of a comparator to keep switching frequency constant in accordance with embodiments of the present invention. In FIG. 2E, the switching period is initially $T_{SW}$ 136. Variations in system parameters or process parameters cause switching period $T_{SW}$ 136 to attempt to decrease to a new level $T_{SW\text{-}NEW}$ 230. V1-V2 reaches threshold 133 faster 236 as switching period $T_{SW}$ 136 decreases to $T_{SW\text{-}NEW}$ 230. To keep switching period $T_{SW}$ 136 constant (and thus to keep the switching frequency constant), FLL 210 adjusts the hysteresis of comparator 206 to force the switching period to be maintained at $T_{SW}$ 136.

FIG. 2F illustrates this change in hysteresis. In FIG. 2F, FLL 210 configures the hysteresis of comparator 206 to a new level $V_{HYS-NEW}$ 238. $V_{HYS-NEW}$ 238 can be configured by, for example, raising threshold 133 to a new level 240. This causes V1-V2 236 to reach new threshold 240 slower, maintaining the switching period at $T_{SW}$ 136. By using this procedure, embodiments of the present invention cause variations in system parameters or process parameters to change hysteresis voltage instead of switching period $T_{SW}$ 136 and switching frequency.

Thus, embodiments of the present invention prevent wide variation in switching frequency of a switching regulator by configuring hysteresis voltage to prevent changes in switching frequency that would otherwise occur due to variations in process and system parameters. Thus, embodiments of the present invention enable the switching frequency of a switching regulator to be maintained at a constant rate (or within tight limits).

Further, as previously discussed, embodiments of the present invention maintain switching frequency without using duty signal delay compensation. By re-configuring the hysteresis of a hysteretic comparator instead of using duty signal delay compensation, embodiments of the present invention advantageously avoid requirements for a higher natural switching frequency than the correcting range of FLL 210. Further, embodiments of the present invention avoid adding more process dependency that requires correction because FLL 210 does not cause additional delays. The control loop of FLL 210 according to embodiments of the present invention is more efficient than circuitry required by other frequency compensation systems, and the transfer function of FLL 210 can be calculated more easily to ensure the stability on the frequency correction loop and optimize its response.

While FIG. 2A shows FLL 210 incorporated into duty cycle controller 204 of Buck switching regulator 100, it should be understood that an FLL according to embodiments of the present invention can be incorporated into any type of switching regulator, and Buck switching regulator 100 is a non-limiting example of a switching regulator that can function with embodiments of the present invention. Further, it should be understood that comparator 206 can be any hysteretic comparator and that comparator 206 is shown as a non-limiting example of a comparator that can be used with embodiments of the present invention.

Additionally, it should be understood that while comparator 206 is shown and described as having two hysteresis voltage thresholds, comparator 206 can be configured to generate a multi-bit duty signal based on measuring V1-V2 134 and comparing it to multiple hysteresis voltage thresholds. For example, in an embodiment, comparator 206 is configured with three hysteresis voltage thresholds, and comparator 206 generates a bitwise "00" when V1-V2 134 is below a first threshold, a bitwise "01" when the first threshold is crossed, and a bitwise "10" when the second threshold is crossed. This two-bit duty signal can be used to drive a switching regulator with a plurality of switches. One of ordinary skill in the art will appreciate that a switching regulator with any number of switches can be designed according to embodiments of the present invention.

2.2 Frequency Lock Loop

Figure 3A:
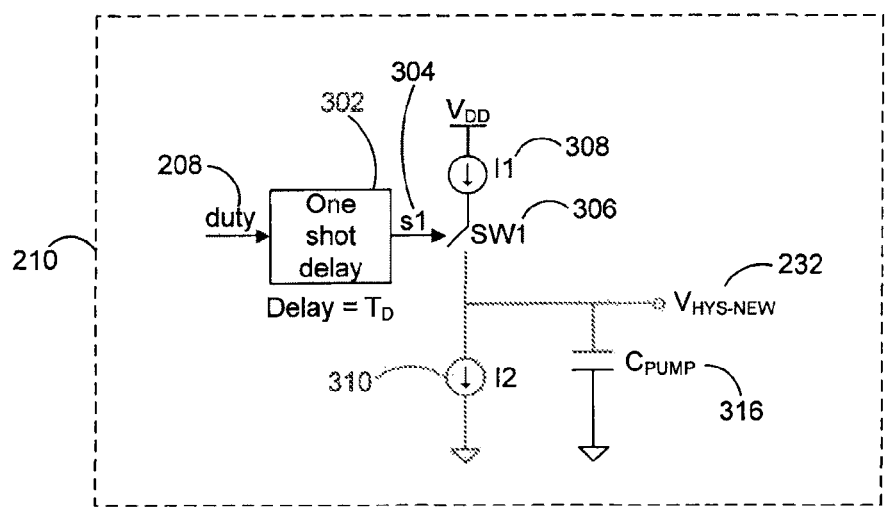
FIG. 3A shows a block diagram of components of a Frequency Lock Loop (FLL) in accordance with an embodiment of the present invention.

FIG. 3A shows a block diagram of components of FLL 210 in accordance with an embodiment of the present invention. As shown in FIG. 3A, duty signal 208 is input into FLL 210, and $V_{HYS-NEW}$ 232 is output from FLL 210. FLL 210 includes a charge-pump including one-shot delay module 302, switch 306, current sources 308 and 310, and capacitor $C_{PUMP}$ 316.

Figure 3B:
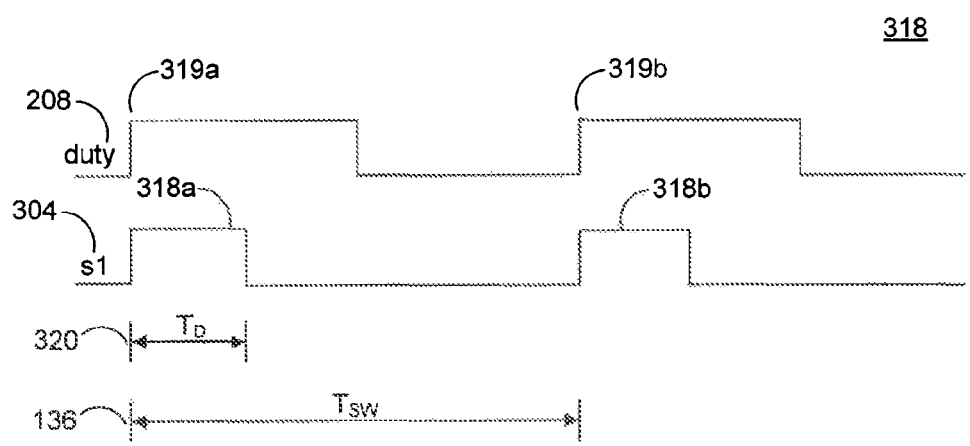
FIG. 3B shows a timing diagram illustrating the generation of a signal for controlling a switch in a FLL according to an embodiment of the present invention.

One-shot delay module 302 outputs a signal s1 304 based on the frequency of duty signal 208. FIG. 3B shows a timing diagram 318 illustrating the generation of s1 304. As shown in FIG. 3B, one shot delay module 302 generates a pulse 318 when it detects each rising edge 319 of duty signal 208. These pulses 318 have width $T_D$ 320, which is configured based on the target switching frequency. By adjusting the width of $T_D$ 320, the switching frequency can be configured to a desired level. For example, $T_D$ 320 can be configured to be a smaller or greater fraction of switching period $T_{SW}$ 136. The ratio between a targeted switching period $T_{SW-REF}$ and $T_D$ is given by the equation $T_{SW-REF}=T_D*k$, where k>1. In an embodiment, $T_D$ 320 remains the same regardless of the pulse duration of duty signal 208 is larger or smaller than $T_D$ 320.

In an embodiment, current source $I_1$ 308 is configured to be larger than current source $I_2$ 310 (which drains current from capacitor 316). For example, in an embodiment, the ratio between current sources 308 and 310 is set as a constant "k" (e.g., $I_1=I_2*k$). For example, in an embodiment, current source 308 is configured to be 4 times stronger than current source 310. Signal s1 304 is used to toggle switch 306 on and off. When s1 304 generates a pulse 318, switch 306 is closed, and current from current source 308 charges capacitor 316 and increases $V_{HYS-NEW}$ 232. Capacitor 316 receives a net positive current flow from current source 308 because current source 308 is configured to be stronger than current source 310. When s1 304 generates a logical "low," switch 306 is opened, and current source 310 causes current to flow away from capacitor 316, discharging capacitor 316 and decreasing $V_{HYS-NEW}$ 232.

If the natural switching frequency $F_{SW}$ is the same as the intended switching frequency $F_{SW-REF}$, then $V_{HYS-NEW}$ does not change the hysteresis voltage of a comparator coupled to FLL 210 (e.g., comparator 206). When FLL 210 is in a steady-state condition, the average current pumped in capacitor 316 by current source $I_1$ 308 is given by the equation $I_{1-AVG}=I_1*T_D/T_{SW}$. Therefore, when the actual switching frequency is equal to the intended switching frequency (i.e., $F_{SW}=F_{SW-REF}$), $I_{1-AVG}=I_1/k=I_2$, meaning that the average current pumped from current source $I_1$ 308 into capacitor 316 is the same as the current discharging capacitor 316. In such a case, voltage $V_{HYS-NEW}$ has a steady constant value.

If the actual switching frequency $F_{SW}$ is larger than the intended reference frequency $F_{SW-REF}$, then $T_{SW}<T_{SW-REF}$. In such a case, $T_D/T_{SW}>1/k$ or $I_{1-AVG}>I_2$. This means that capacitor 316 will always be charged up by the current difference $I_{1-AVG}-I_2$, causing $V_{HYS-NEW}$ 232 to increase. Increasing $V_{HYS-NEW}$ 232 leads to an increase in the switching period and a decrease in the switching frequency. Thus, FLL 210 forces switching frequency to reduce until the condition $I_{1-AVG}=I_2$ is met. At this condition, $T_{SW}=T_D*k=T_{SW-REF}$. FLL 210 likewise causes an increase to switching frequency when the actual switching frequency is lower than the reference switching frequency. The reference switching frequency can be given by the equation $F_{SW-REF}=1/(T_D*k)$ and can be set by design by choosing delay time $T_D$ 320 and ratio factor k.

Figure 4:
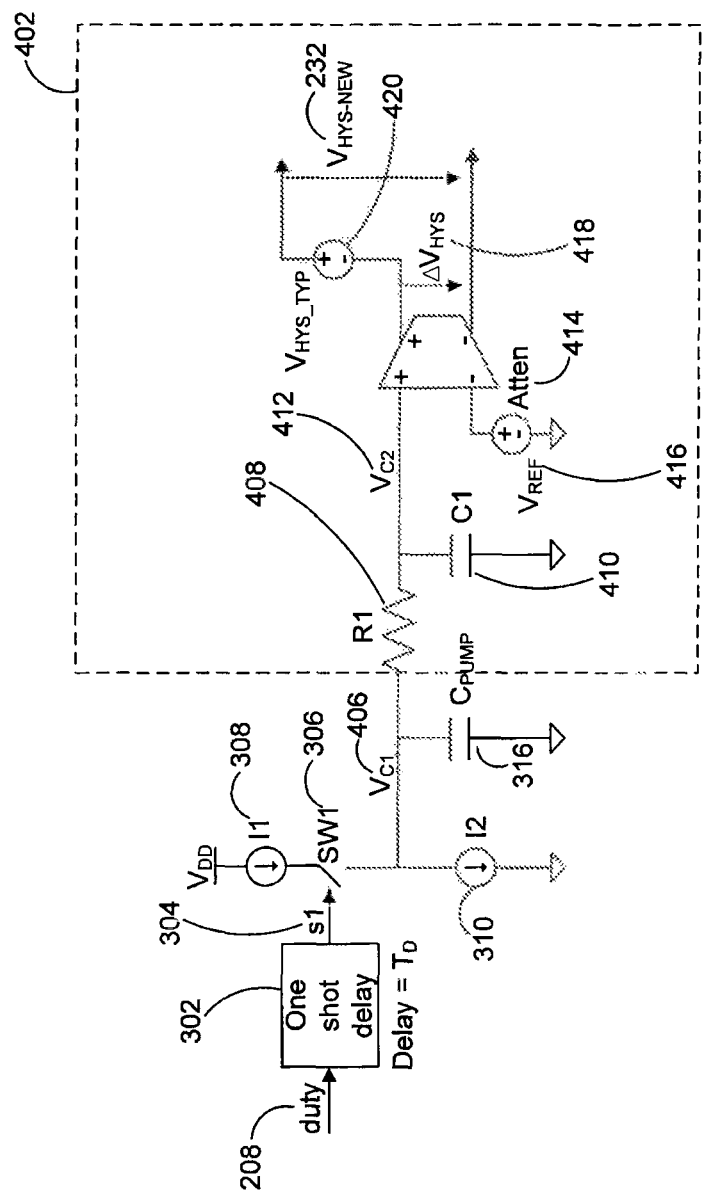
FIG. 4 shows a diagram illustrating components of a FLL incorporating an attenuation module in accordance with an embodiment of the present invention.

FIG. 4 shows a diagram illustrating components of FLL 210 in accordance with another embodiment of the present invention. In FIG. 4, attenuation module 402 is added to FLL 210 to adjust the range of the output of the charge pump $V_{C1}$ 406 to an input range of a comparator (e.g., comparator 206). In an embodiment, attenuation module 402 includes resistor 408, capacitor 410, and attenuator 414. Attenuation module 402 receives the output $V_{C1}$ 406 from the circuitry of FIG. 3A and attenuates it before it is sent to a comparator (e.g., comparator 206) as $V_{HYS-NEW}$ 232. As previously discussed, in an embodiment, $V_{HYS-NEW}$ 232 corresponds to signal $V_{HYS}$ 212 shown in FIG. 2A. In another embodiment, $V_{HYS-NEW}$ 232 is modified before it is transmitted to comparator 206 as signal $V_{HYS}$ 212.

In FIG. 4, the voltage across capacitor $C_{PUMP}$ 316 is output as $V_{C1}$ 406 to resistor 408 and capacitor 410, which filter $V_{C1}$ 406 to a new value $V_{C2}$ 412, which is input into attenuator 414. Resistor 408 and capacitor 410 smooth out sudden small voltage changes at node $V_{C1}$ 1406 due to closing an opening switch 306. Resistor 408 and capacitor 410 are optional elements of this embodiment, and it should be understood that $V_{C1}$ 406 can be directly input into attenuator 414 in accordance with an embodiment of the present invention.

Attenuator 414 determines the strength of the correction required and reduces the voltage of $V_{C2}$ 412 based on $V_{REF}$ 416 so that a value of $V_{C2}$ 412 is within an appropriate range of a comparator (e.g., comparator 206). In an embodiment, attenuator 414 outputs an adjustment $\Delta V_{HYS}$ 418 relative to a typical hysteresis ($V_{HYS-TYP}$ 420). However, it should be understood that $V_{HYS-TYP}$ 420 is optional, and in embodiments of the present invention, the output of attenuator 414 is not scaled by $V_{HYS-TYP}$ 420.

In an embodiment, $\Delta V_{HYS}$ 418 can be determined according to the equation $\Delta V_{HYS}=A^*(V_{C2}-V_{REF})$, where A represents an attenuation coefficient of attenuator 414, and wherein A<1. Attenuator 414 accommodates the voltage ranges from charge pump output $V_{C1}$ 406 to the output of $V_{HYS-NEW}$ 232. In an embodiment, hysteresis of comparator 206 is usually in range of tens of millivolts, and the output $V_{C1}$ 406 of the charge pump is usually in range of hundreds of millivolts. Therefore, in an embodiment, the attenuation value of attenuator 414 is ideally in range of tens of times. If the charge pump voltage $V_{C1}$ 406 variation and hysteresis voltage $V_{HYS-NEW}$ 232 are in the same range, attenuator 414 is not needed. In an embodiment, attenuator 414 can also become a gain stage if $V_{HYS-NEW}$ 232 is larger than the range of the charge pump voltage $V_{C1}$ 406. If the natural switching frequency $F_{SW}$ is the same as the intended switching frequency $F_{SW-REF}$, then $V_{C1}=V_{C2}=V_{REF}$, $\Delta V_{HYS}=0V$, and $V_{HYS}=V_{HYS-TYP}$.

Figure 5:
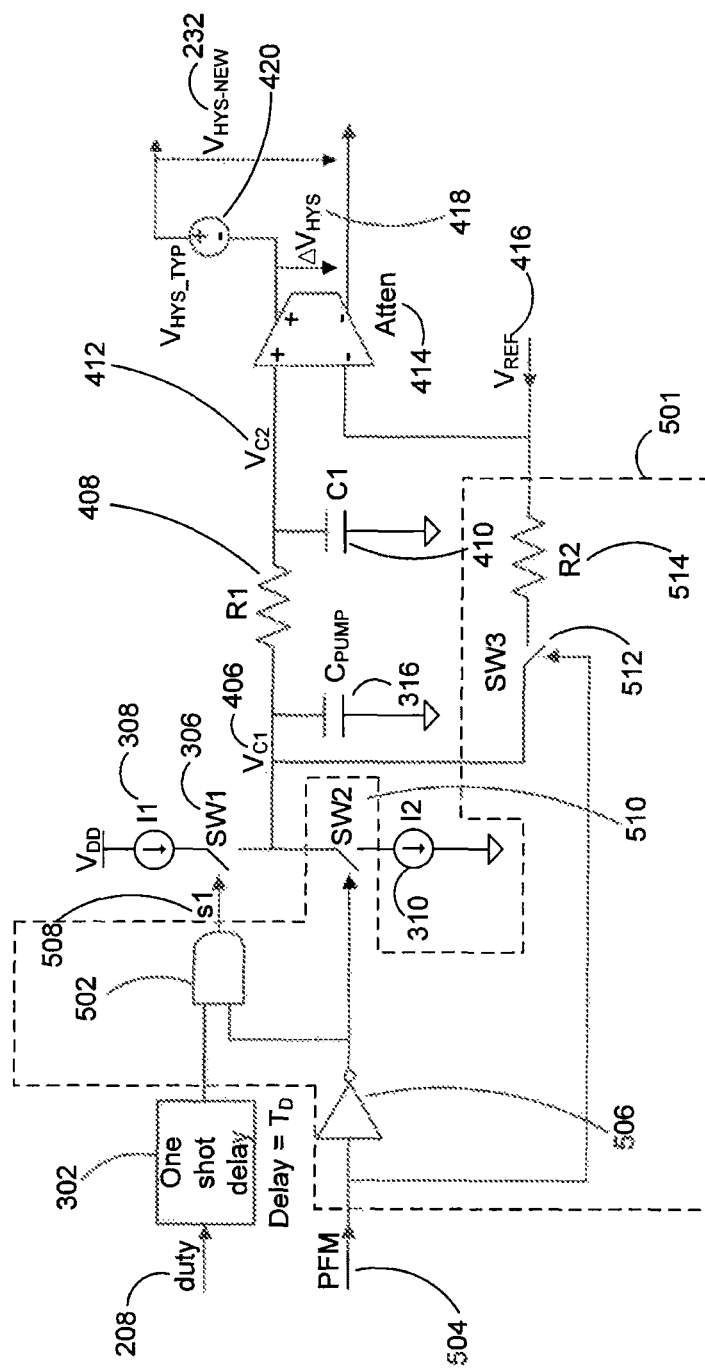
FIG. 5 shows a diagram illustrating components of a FLL incorporating a light load condition compensation module in accordance with another embodiment of the present invention.

FIG. 5 shows a diagram illustrating components of FLL 210 in accordance with another embodiment of the present invention. In FIG. 5, a light load condition compensation module is added to the embodiment of FLL 210 shown in FIG. 4 to compensate for light load conditions of a switching regulator coupled to FLL 210 (e.g., Buck switching regulator 100).

Typically, the switching frequency goes very low during light load conditions in order to maintain good efficiency. In this case, the switching frequency can be a few orders lower than in normal load case. Such operating modes are referred as pulse frequency modulation (PFM), pulse skipping mode, burst mode, discontinuous conduction mode, etc. For simplicity, the light load condition will be referred as PFM mode. During PFM mode, the actual switching frequency can be very low (and thus, the switching period can be very high). In such a case, FLL 210 can become saturated trying to correct the frequency by making $V_{HYS-NEW}$ 232 smaller and smaller. More precisely, $V_{C1}$ 406 and $V_{C2}$ 412 will go to ground trying to lower $V_{HYS-NEW}$ 232 to increase the switching frequency. Thus, in an embodiment, when FLL 210 becomes saturated, the switching frequency is not properly corrected, and attempts to correct the switching frequency that result in $V_{C1}$ 406 and $V_{C2}$ 412 going to ground should be avoided.

In an embodiment, to avoid FLL 210 going to saturation, a light load condition compensation module 501 is added to FLL 210. Light load condition compensation module 501 includes AND gate 502, inverter 506, resistor 514, and switches 510 and 512. PFM signal 504 is input into this additional circuitry. In an embodiment, PFM signal 504 is a logic input signal that indicates that the switching regulator is operating in PFM mode (a light load condition). While PFM signal 504 is shown in FIG. 5, it should be understood that any light load condition signal can be used and that PFM mode is one of a plurality of light load modes that can be detected and compensated for by embodiments of the present invention. For example, in an embodiment, PFM signal 504 is generated by a 0 current detector.

If the PFM signal 504 is "low," the functionality of FLL 210 according to the embodiment of FIG. 5 is identical to the embodiment of FIG. 4 because the additional circuitry is not switched in. In other words, when PFM generates a logical "low," switch 510 is always closed because it receives a logical "high" signal from inverter 506, and the behavior of switch 306 is determined based on one-shot delay module 302 because and gate 502 receives a logical "high" from inverter 506. Further, switch 512 is always open when PFM signal 504 is low.

When PFM signal 504 goes "high," both current sources 308 and 310 are disconnected from capacitor 316 by opening both switch 306 and switch 510, and the charge pump is put in high impedance ("HighZ") mode. Further, during PFM mode (when PFM signal 504 is "high"), switch 512 closes, connecting resistor 514 to the circuit to bring the voltage at the $V_{C1}$ node 406 to the typical voltage when $V_{HYS-NEW}=V_{HYS-TYP}$ (i.e., $\Delta V_{HYS}=0$). Therefore, in PFM mode, the output hysteresis voltage $V_{HYS-NEW}$ 232 will go back to the typical value $V_{HYS-TYP}$ 420 instead of going to a minimum value due to saturation of FLL 210. The time constant given by resistor 514 and capacitor 316 ensures a smooth transition to and from typical hysteresis voltage $V_{HYS-TYP}$ 420 when in and out of PFM mode. Such a smooth transition ensures that any voltage glitch at the switching regulator output is avoided.

Thus, using the additional circuitry of light load condition compensation module 501 added in FIG. 5, embodiments of the present invention put FLL 210 into a HighZ mode to prevent $V_{C1}$ 406 and $V_{C2}$ 412 going to ground while attempting to correct the switching frequency during light load conditions.

While light load condition compensation module 501 is shown in FIG. 5 as being added to the FLL embodiment shown in FIG. 4, it should be understood that the light load condition compensation module 501 discussed herein can be added to the FLL embodiment shown in FIG. 3A. For example, circuitry including and gate 502, inverter 506, and switch 510 can be added to the embodiment of the FLL shown in FIG. 3A to put the FLL into a HighZ mode during light load conditions.

3. METHODS

Figure 6:
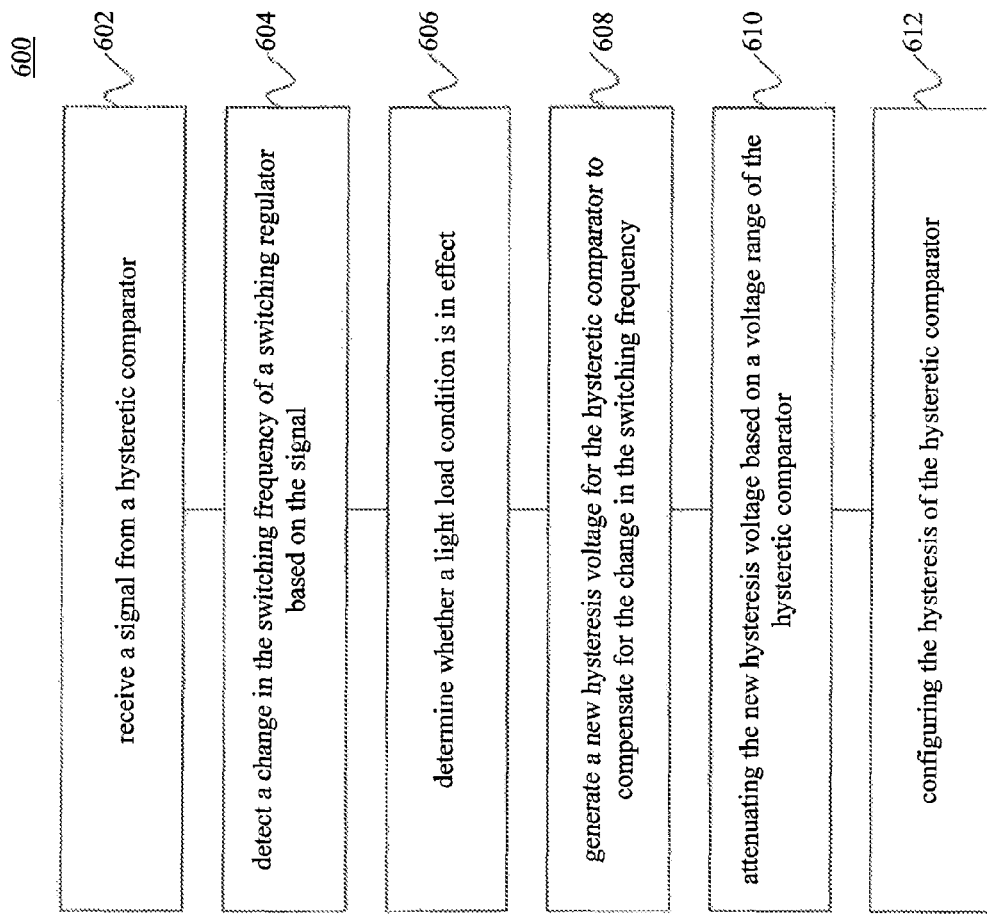
FIG. 6 is a flowchart of a method of maintaining a switching frequency of a switching regulator in accordance with an embodiment of the present invention.

A method of maintaining a switching frequency of a switching regulator coupled to a hysteretic comparator in accordance with an embodiment of the present invention will now be explained with reference to the flowchart of FIG. 6. In step 602, a signal (e.g., duty signal 208) is received from a hysteretic comparator (e.g., comparator 206). In step 604, the signal is analyzed to determine whether there has been a change in switching frequency of the switching regulator (e.g., Buck switching regulator 100).

In step 606, a determination is made regarding whether a light load condition is in effect (e.g., a PFM mode indicated by PFM signal 504). This step is optional. In an embodiment, if a light load condition is in effect, a high impedance signal is generated (e.g., by opening switches 306 and 510 and closing switch 512), and no attempt is made to configure the hysteresis of the hysteretic comparator until the light load condition is no longer in effect.

In step 608, a new hysteresis voltage (e.g., $V_{HYS-NEW}$ 232) for the hysteretic comparator is generated to compensate for the change in the switching frequency. This new hysteresis voltage can be generated, for example, based on a predetermined constant that corresponds to the desired switching frequency. In an embodiment, the hysteresis voltage is increased or reduced until the duty signal indicates that the switching frequency is equal to the desired switching frequency.

In step 610, the new hysteresis voltage for the hysteretic comparator is attenuated (e.g., by attenuation module 402 based on a voltage range of the hysteretic comparator. This step is optional. The new hysteresis voltage can be attenuated, for example, using an attenuator (e.g., attenuator 414) configured to attenuate the new hysteresis voltage based on a reference voltage (e.g., $V_{REF}$ 416) corresponding to the voltage range of the hysteretic comparator.

In step 612, the hysteresis of the hysteretic comparator is configured based on the generated new hysteresis voltage. For example, a hysteresis voltage threshold of the hysteretic comparator (e.g., threshold 133) is raised or lowered to a new level (e.g. thresholds 234 and 240), keeping the switching period (e.g., $T_{SW}$ 136) constant, and thus also keeping the switching frequency of the switching regulator constant. One or more of the above steps can be repeated until the duty signal indicates that there is no change in the switching frequency.

Figure 7:
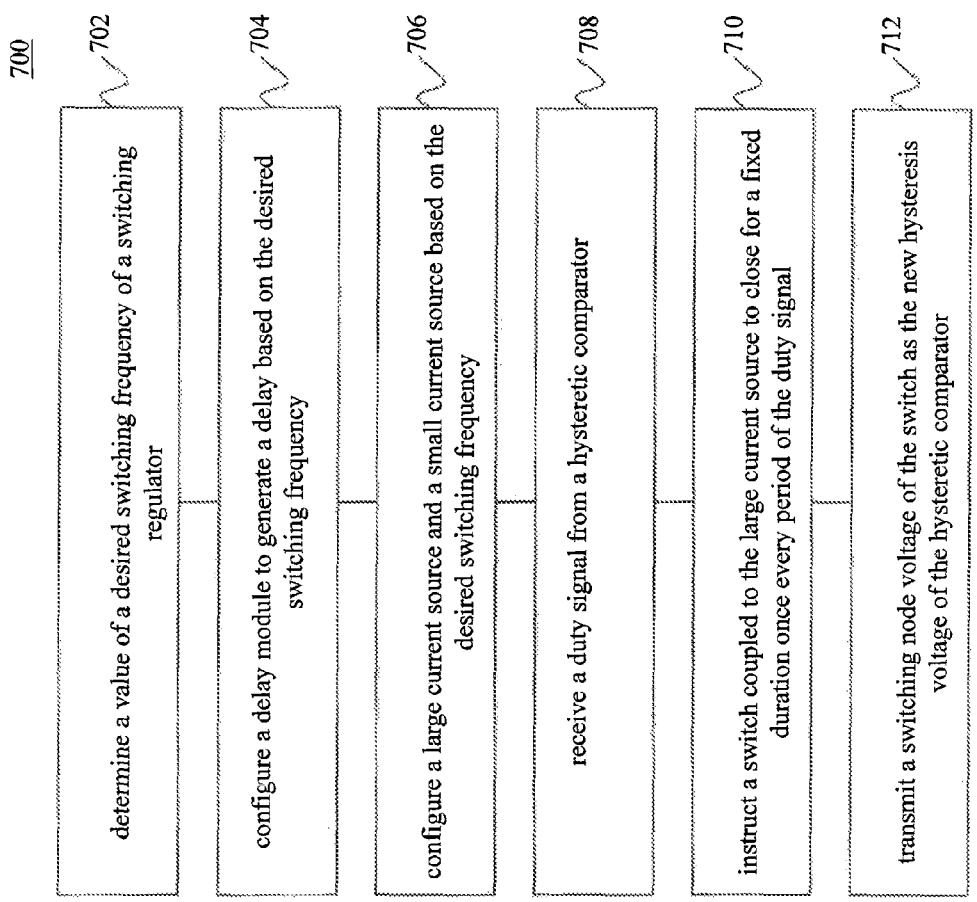
FIG. 7 is a flowchart of a method of modifying a hysteresis voltage of a hysteretic comparator in accordance with an embodiment of the present invention.

A method of modifying a hysteresis voltage of a hysteretic comparator will now be explained with reference to the flowchart of FIG. 7. In step 702, a value of a desired switching frequency of a switching regulator (e.g., Buck switching regulator 100) is determined.

In step 704, a delay module (e.g., delay module 302) is configured to generate a delay based on the desired switching frequency. For example, in an embodiment, delay module 302 is configured to generate pulses 318 that have width $T_D$ 320. The targeted switching frequency corresponds to a targeted switching period $T_{SW-REF}$, and, in an embodiment, the ratio between a targeted switching period $T_{SW-REF}$ and $T_D$ is given by the equation $T_{SW-REF}=T_D*k$, where k>1. The length of pulses 318 of delay module 302 can thus be configured based on the targeted switching frequency.

In step 706, a large current source (e.g., current source $I_1$ 308) and a small current source (e.g., current source $I_2$ 310) are configured based on the desired switching frequency. For example, in FIG. 3A, under a steady-state condition, the values of $I_1$ 308 and $I_2$ 310 are configured so that the average current value from 308 as it is switched in and out of the circuit by switch 306 is given by the equation $I_{1-AVG}=I_1*T_D/T_{SW}$. Thus, when the actual switching frequency is equal to the intended switching frequency ($F_{SW}=F_{SW-REF}$), $I_{1-AVG}=k=I_2$. The current values of $I_1$ 308 and $I_2$ 310 can therefore be selected based on the constant k used to configure the delay module discussed in step 704.

In step 708, a duty signal (e.g., duty signal 208) is received from a hysteretic comparator (e.g., comparator 206). In step 710, a switch coupled to the large current source to close for a fixed duration once every period in the duty signal. For example, switch 306 in FIG. 3A is configured to close once every switching period $T_{SW}$ 136 for fixed duration $T_D$ 320. When switch 306 closes, current from $I_1$ 308 flows into the circuit.

In step 708, a switching node voltage (e.g., $V_{HYS-NEW}$ 232) of the switch is transmitted as the new hysteresis voltage of the hysteretic comparator. For example, in FIG. 3A, capacitor $C_{PUMP}$ 316 stores the switching node voltage as $I_1$ 308 is switched in and out of the circuit by switch 306. In an embodiment, the above steps are repeated until the condition $I_{1-AVG}=I_2$ is met, thus establishing a steady-state condition where the switching frequency of the switching regulator is equal to the desired switching frequency.

Figure 8:
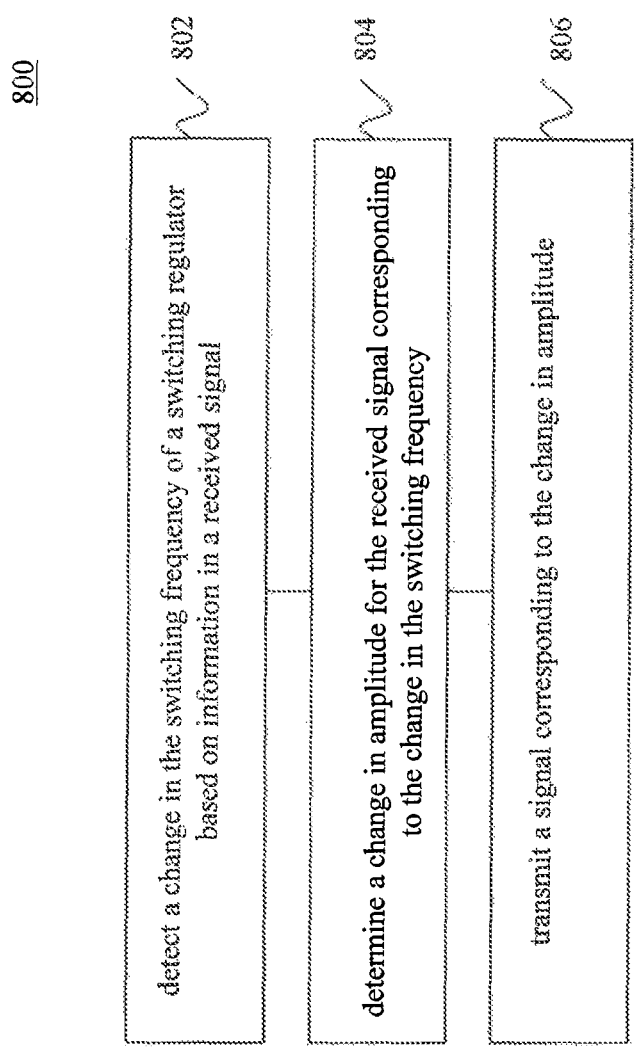
FIG. 8 is a flowchart of a method of modifying the amplitude of a signal responsive to a detected change in switching frequency.

According to embodiments of the present invention described above, systems and methods are provided for detecting a change in switching frequency and modifying the amplitude of a signal (e.g., V1-V2 134 and/or the hysteresis threshold(s) of comparator 206) responsive to this detected change in switching frequency to prevent (or alleviate) this change in switching frequency. A method of modifying the amplitude of a signal responsive to a detected change in switching frequency will now be described with reference to the flowchart of FIG. 8.

In step 802, a change in the switching frequency of a switching regulator is detected based on information in a received signal. For example, FLL 210 detects a change in the switching frequency of Buck regulator 100 based on information in duty signal 208.

In step 804, a change in amplitude for the received signal corresponding to the change in the switching frequency is determined. For example, FLL 210 determines a new hysteresis threshold for comparator 206. Further, by doing so, FLL 210 also determines a new amplitude for signal V1-V2 134 (e.g., new V1-V2 shown by elements 228 and 236). In step 806, a signal corresponding to the change in amplitude is transmitted. For example, FLL 210 transmits $V_{HYS-NEW}$ 232.

Thus, according to embodiments of the present invention described above, FLL 210 continually receives duty signal 208, detects changes in switching frequency (e.g., due to changes in system parameters) based on information contained in this signal, and modifies the amplitude of one or more signals to prevent these changes in switching frequency from taking effect. As FLL 210 modifies the amplitude of these one or more signals, duty signal 208 transmits information to FLL 210 indicating the effects of these amplitude modifications on the switching frequency. FLL 210 continues to adjust the amplitude of these one or more signals until the switching frequency has stabilized at a desired value (e.g., the desired switching frequency set by configuring various system elements, such as those described in steps 704 and 706).

4. CONCLUSION

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present invention.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A voltage regulator, comprising:
    a first switch;
    a hysteretic comparator coupled to an output of the first switch, wherein the hysteretic comparator is configured to generate a duty signal; and
    a Frequency Lock Loop (FLL), comprising:
        a delay module,
        a second switch coupled to the delay module,
        a first current source coupled to the second switch, and
        a second current source coupled to the second switch, wherein the first current source is configured to be larger than the second current source, wherein the FLL is coupled to a control input of the hysteretic comparator, and wherein the FLL is configured to:
            receive the duty signal,
            adjust a width of a pulse generated by the delay module based on a target switching frequency of the hysteretic comparator and a ratio of current between the first current source and the second current source, and
            generate, based on the pulse, a signal to alter a hysteresis of the hysteretic comparator such that a switching frequency of the first switch is maintained at the target switching frequency.

2. The voltage regulator of claim 1, wherein the signal is configured to alter the hysteresis of the hysteretic comparator such that the switching frequency of the first switch is maintained constant.

3. The voltage regulator of claim 1, wherein the FLL is further configured to:
    detect a change in the switching frequency of the first switch; and
    generate the signal to alter the hysteresis of the hysteretic comparator based on the change in the switching frequency of the first switch.

4. The voltage regulator of claim 1, wherein the hysteretic comparator is further configured to measure a differential voltage between a switching node voltage of the first switch and an output voltage of the voltage regulator.

5. The voltage regulator of claim 1, wherein the hysteretic comparator is further configured to measure a second signal indicative of a current flowing through an inductor coupled to the first switch.

6. A Frequency Lock Loop (FLL) for a switching regulator, the FLL comprising:
    a switch;
    a first current source coupled to the switch;
    a second current source coupled to the switch, wherein the first current source is configured to be larger than the second current source;
    a delay module, wherein the switch is controlled by an output of the delay module, and wherein the delay module is configured to:
        receive a duty signal, and
        generate a pulse, wherein a width of the pulse is adjusted based on a target switching frequency of a hysteretic comparator coupled to the switching regulator and a ratio of current between the first current source and the second current source; and
    a capacitor coupled to the switch and the second current source.

7. The FLL of claim 6, wherein the delay module is further configured to output a control signal comprising a series of fixed-width pulses to control the switch, and wherein one fixed-width pulse from among the series of fixed-width pulses is transmitted per period of the duty signal.

8. The FLL of claim 6, wherein the FLL is configured to transmit a voltage across the capacitor to the hysteretic comparator.

9. The FLL of claim 6, further comprising:
    an attenuation module coupled to the capacitor.

10. The FLL of claim 9, wherein the attenuation module comprises an attenuator, wherein the attenuator is configured to reduce a voltage across the capacitor by a reference voltage, wherein the reference voltage is configured based on a voltage range of the hysteretic comparator.

11. The FLL of claim 10, wherein the attenuation module is configured to generate a signal to adjust a hysteresis of the hysteretic comparator.

12. The FLL of claim 6, further comprising a light load condition compensation module configured to detect a light load condition of the switching regulator.

13. The FLL of claim 12, wherein the light load condition compensation module is configured to:
    receive a signal indicative of the light load condition; and
    place the FLL into a high impedance mode responsive to the signal indicative of the light load condition.

14. A method of maintaining a switching frequency of a switching regulator at a target switching frequency, the method comprising:
- receiving a duty signal from a hysteretic comparator;
- detecting a change in the switching frequency based on the duty signal;
- adjusting a width of a pulse generated by a delay module of a Frequency Lock LOOP (FLL) based on the target switching frequency of the hysteretic comparator and a ratio of current between a first current source and a second current source in the switching regulator, wherein the first current source is larger than the second current source; and
- configuring, based on the pulse, a hysteresis of the hysteretic comparator to compensate for the change in the switching frequency.

15. The method of claim 14, further comprising:
- determining a delay time based on a desired switching frequency; and
- configuring a hysteresis voltage based on the delay time.

16. The method of claim 14, further comprising:
- generating a hysteresis voltage for the hysteretic comparator; and
- attenuating the hysteresis voltage based on a voltage range of the hysteretic comparator.

17. The method of claim 14, further comprising:
- detecting a light load condition of the switching regulator; and
- generating a signal indicative of a high impedance mode responsive to detecting the light load condition.

18. A voltage regulator, comprising:
- a hysteretic comparator configured to generate a duty signal; and
- a Frequency Lock Loop (FLL) coupled to a control input of the hysteretic comparator, wherein the FLL comprises:
  - a delay module configured to receive the duty signal,
  - a first switch controlled by an output of the delay module,
  - a first current source coupled to the first switch,
  - a second current source coupled to a second switch,
  - a capacitor coupled to the first switch and the second switch, and
  - a light load compensation module configured to:
    - detect a light load condition, and
    - in response to detecting the light load condition, initiate:
      - a first disconnection of the first current source from the first switch, and
      - a second disconnection of the second current source from the second switch.

19. The voltage regulator of claim 18, wherein the FLL further comprises:
- an attenuator, coupled to the capacitor, configured to adjust an output of the capacitor to an input range of the hysteretic comparator.

20. The voltage regulator of claim 18, wherein a width of a pulse generated by the delay module is configured to adjust a switching frequency of the hysteretic comparator.

* * * * *